United States Patent [19]
Ito

[11] Patent Number: 5,101,785
[45] Date of Patent: Apr. 7, 1992

[54] CONTROL DEVICE FOR AN INTERNAL COMBUSTION ENGINE

[75] Inventor: Yasushi Ito, Susono, Japan

[73] Assignee: Toyota Jidosha Kabushiki Kaisha, Japan

[21] Appl. No.: 662,480

[22] Filed: Feb. 28, 1991

[30] Foreign Application Priority Data

Mar. 8, 1990 [JP] Japan ................... 2-54898

[51] Int. Cl.$^5$ ............................................. F02D 31/00
[52] U.S. Cl. .................................... 123/357; 123/299
[58] Field of Search ............... 123/500, 501, 422, 295, 123/299, 494, 300, 478, 357, 358, 359

[56] References Cited

U.S. PATENT DOCUMENTS

| | | | |
|---|---|---|---|
| 4,401,076 | 8/1983 | Sano | 123/501 |
| 4,516,550 | 5/1985 | Buck | 123/357 |
| 4,566,417 | 1/1986 | Suzuki | 123/357 |
| 4,589,391 | 5/1986 | Sieber | 123/501 |
| 4,619,234 | 10/1986 | Okamoto | 123/357 |
| 4,718,391 | 1/1988 | Rimbold | 123/357 |
| 4,763,630 | 8/1988 | Nagase | 123/357 |
| 4,790,277 | 12/1988 | Schechter | 123/357 |
| 4,836,161 | 6/1989 | Abthoff | 123/299 |
| 4,836,165 | 6/1989 | Kubota | 123/357 |
| 4,955,339 | 9/1990 | Sasaki | 123/295 |

FOREIGN PATENT DOCUMENTS

| | | |
|---|---|---|
| 61-25910 | 6/1986 | Japan . |
| 62-191622 | 8/1987 | Japan . |
| 2-169834 | 6/1990 | Japan . |

Primary Examiner—Carl Stuart Millen

[57] ABSTRACT

A control device for an internal combustion engine, comprising a calculating unit for calculating an engine control value for controlling an engine running condition on the basis of a conversion value into which a first engine condition value, which represents an engine running condition, is converted, and a converting unit for converting the first engine condition value into the conversion value. The engine control value discontinuously changes at a discontinuous point in accordance with a change of the first engine condition value, and the first engine condition value corresponding to the discontinuous point changes in accordance with a change of a second engine condition value. The conversion value corresponding to the discontinuous point remains constant even when the second engine condition value changes.

12 Claims, 10 Drawing Sheets

Fig. 2
Fig. 3
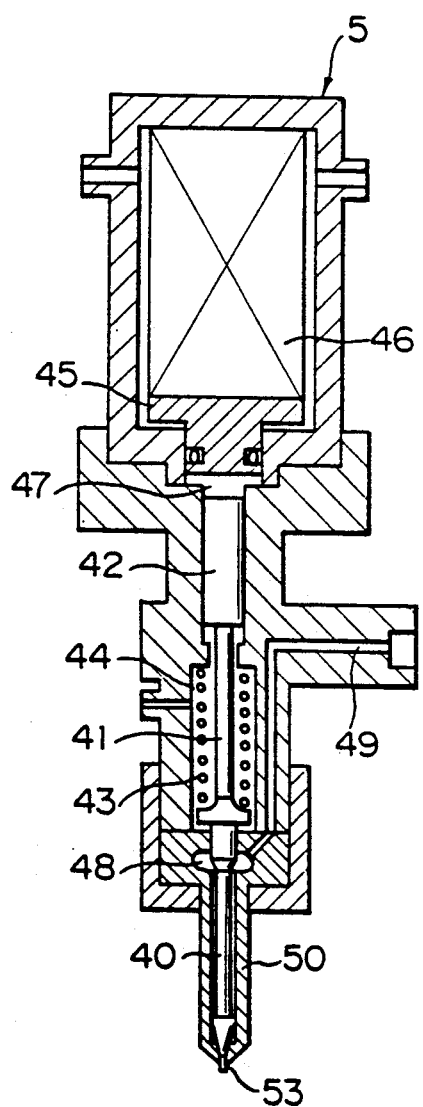
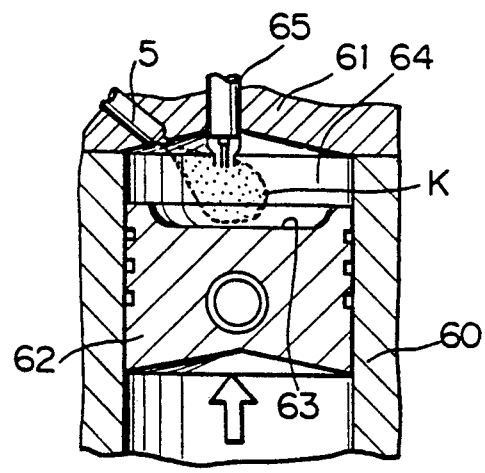

Fig. 7

| $\theta A$ \ $N_e$ | $N_{e1}$ | --- | $N_{ea}$ | $N_{eb}$ | --- | $N_{en}$ |
|---|---|---|---|---|---|---|
| $\theta_{IDLE}$ | $Q_{Cl1}$ | --- | $Q_{Cla}$ | $Q_{Clb}$ | --- | $Q_{Cln}$ |
| ⋮ | ⋮ | | | | | ⋮ |
| $\theta_{Mb}$ / $\theta_{Mb}'$ | | --- | --- | $Q_{Mb}$ / $Q_{Db}$ | --- | |
| $\theta_{Ma}$ / $\theta_{Ma}'$ | | --- | $Q_{Ma}$ / $Q_{Da}$ | --- | --- | |
| $\theta_{Hb}$ / $\theta_{Hb}'$ | | --- | --- | $Q_{Db}$ / 0 | --- | |
| $\theta_{Ha}$ / $\theta_{Ha}'$ | | --- | $Q_{Da}$ / 0 | --- | --- | |
| ⋮ | ⋮ | | | | | ⋮ |
| $\theta_W$ | $Q_{cm1}$ | --- | --- | --- | --- | $Q_{cmn}$ |

$4n$ (left brace around θ rows)     $4n^2$ (right brace around Q rows)

| | $N_{e1}$ | --- | $N_{ea}$ | $N_{eb}$ | --- | $N_{en}$ |
|---|---|---|---|---|---|---|
| $\theta_M$ | $\theta_{M1}$ | --- | $\theta_{Ma}$ | $\theta_{Mb}$ | --- | $\theta_{Mn}$ |
| $\theta_H$ | $\theta_{H1}$ | --- | $\theta_{Ha}$ | $\theta_{Hb}$ | --- | $\theta_{Hn}$ |
| $R_M$ | $R_{M1}$ | --- | $R_{Ma}$ | $R_{Mb}$ | --- | $R_{Mn}$ |
| $R_K$ | $R_{K1}$ | --- | $R_{Ka}$ | $R_{Kb}$ | --- | $R_{Kn}$ |
| $R_H$ | $R_{H1}$ | --- | $R_{Ha}$ | $R_{Hb}$ | --- | $R_{Hn}$ |

Fig. 13

| IQ \ Ne | Ne1 | --- | Nea | Neb | --- | Nen |
|---|---|---|---|---|---|---|
| 0 | q11 | --- | q1a | q1b | --- | q1n |
| ΔIQ | q21 | --- | q2a | q2b | --- | q2n |
| ⋮ | ⋮ | | | | | ⋮ |
| IQ$_M$ | | | | | | |
| IQ$_M$+ΔIQ | | | | | | |
| ⋮ | ⋮ | | | | | ⋮ |
| IQ$_H$ | | | | | | |
| IQ$_H$+ΔIQ | | | | | | |
| ⋮ | ⋮ | | | | | ⋮ |
| IQ$_{max}$ | qm1 | --- | -- | -- | --- | qmn |

CONTROL DEVICE FOR AN INTERNAL COMBUSTION ENGINE

BACKGROUND OF THE INVENTION

1. Field of the Invention

The present invention relates to a control device for an internal combustion engine.

2. Description of the Related Art

Japanese Examined Patent Publication No. 61-25910 discloses a control device for an internal combustion engine having a two-dimensional map of an ignition timing memorized in a ROM. In this device, the ignition timing is calculated by a linear interpolation method on the basis of an engine speed and a pressure in an intake pipe. Namely, when a detected engine speed exists between two adjoining engine speeds shown on a map, the ignition timing corresponding to the detected engine speed is calculated proportionally on the basis of two ignition timings corresponding to the two adjoining engine speeds.

Nevertheless, when the ignition timing is discontinuously changed in accordance with changes of the pressure in the intake pipe, and the pressure in the intake pipe corresponding to a discontinuous point changes in accordance with the engine speed, if the ignition timing corresponding to the detected engine speed is calculated by a linear interpolation method without considering the discontinuous point, a problem arises in that a calculated ignition timing is far different from an ideal ignition timing.

Therefore, when all of the pressures in the intake pipe corresponding to all of the discontinuous points are shown on the map, to thereby take the discontinuous points into consideration, a problem arises in that a capacity of a memory must be greatly increased.

SUMMARY OF THE INVENTION

An object of the present invention is to provide a control device for an internal combustion engine by which the above problems are solved.

According to the present invention, there is provided a control device for an internal combustion engine, comprising: a calculating means for calculating an engine control value for controlling an engine running condition on the basis of a conversion value into which a first engine condition value, which represents an engine running condition, is converted, which engine control value discontinuously changes at a discontinuous point in accordance with a change of the first engine condition value, which first engine condition value corresponding to the discontinuous point changes in accordance with a change of a second engine condition value which represents the engine running condition; and a converting means for converting the first engine condition value into the conversion value, which conversion value corresponds to a constant discontinuous point even when the second engine condition value is changed.

The present invention may be more fully understood from the description of preferred embodiment of the invention set forth below, together with the accompanying drawings.

BRIEF DESCRIPTION OF THE DRAWINGS

In the drawings:

FIG. 2 is a cross-sectional side view of a fuel injector;

FIG. 3 is a cross-sectional side view of an engine to which a embodiment of the present invention is applied;

FIG. 7 is a view illustrating the map;

FIG. 13 is a view illustrating the map; and

DESCRIPTION OF THE PREFERRED EMBODIMENTS

Figure 1:
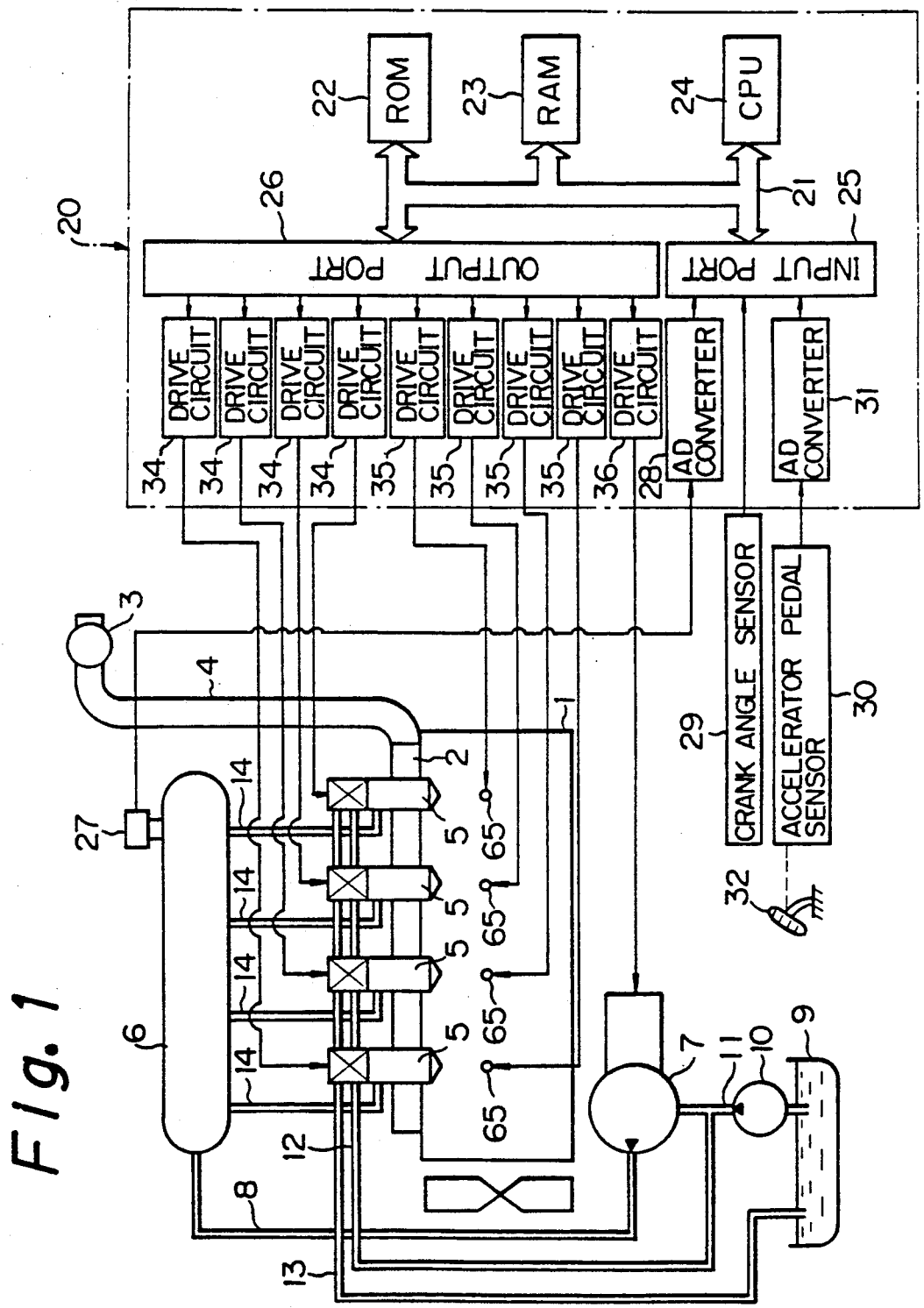
FIG. 1 is a schematic view of a four-cylinder gasoline engine.

Referring to FIG. 1, reference numeral 1 designates an engine body, 2 a surge tank, 3 an air cleaner, 4 an intake pipe, 5 fuel injectors, 65 spark plugs, and 6 a reservoir tank. The intake pipe 4 connects the surge tank 2 to the air cleaner 3, and a low pressure fuel pump 10 supplies fuel from a fuel tank 9 to a high pressure fuel pump 7 via a conduit 11. The high pressure fuel pump 7 supplies a high pressure fuel to the reservoir tank 6 via a high pressure conduit 8. The conduit 11 is connected to a cooling pipe 12 for cooling the piezoelectric elements of each fuel injector 5, and the cooling pipe 12 is connected to the fuel tank 9 via a return pipe 13. Each fuel supply pipe 14 connects each fuel injector 5 to the reservoir tank 6.

The electronic control unit 20 is constructed as a digital computer and includes a ROM (read only memory) 22, a RAM (random access memory) 23, a CPU (microprocessor, etc.) 24, an input port 25, and an output port 26. The ROM 22, the RAM 23, the CPU 24, the input port 25, and the output port 26 are interconnected via a bidirectional bus 21. A pressure sensor 27 for detecting a pressure in the reservoir tank 6 is connected to the input port 25 via an AD converter 28. A crank angle sensor 29 generates a pulse at predetermined crank angles, and the pulses output by the crank angle sensor 29 are input to the input port 25, and accordingly, an engine speed is calculated on the basis of the pulses output by the crank angle sensor 29. An accelerator pedal sensor 30 for detecting a degree of opening $\theta A$ of an accelerator pedal 32 is connected to the input port 25 via an AD converter 31.

Each fuel injector 5 is connected to the output port 26 via corresponding drive circuits 34, each spark plug 65 is connected to the output port 26 via corresponding drive circuits 35, and the high pressure fuel pump 7 is connected to the output port 26 via a drive circuit 36.

FIG. 2 illustrates the fuel injector 5. Referring to FIG. 2, reference numeral 40 designates a needle inserted into a nozzle 50, 41 a rod, 42 a movable plunger, 45 a pressure piston, 46 a piezoelectric element, and 48 a needle pressure chamber. A compression spring 43 is arranged in a spring space 44 and urges the needle 40 downward. A pressure chamber 47 is defined by the top of the movable plunger 42 and the bottom of the pressure piston 45, and is filled with fuel. The needle pressure chamber 48 is connected to the reservoir tank 6 (FIG. 1) via a fuel passage 49 and the fuel supply pipe 14 (FIG. 1), and accordingly, high pressure fuel in the reservoir tank 6 is supplied to the fuel chamber 48 via the fuel supply pipe 14 and the fuel passage 49. When a charge is given to the piezoelectric element 46 to stop the fuel injection, the piezoelectric element 46 expands axially, and as a result, the pressure piston 45 is moved downward in FIG. 2, and thus the fuel pressure in the pressure chamber 47 is rapidly increased. When the fuel pressure in the pressure chamber 47 is increased, the movable plunger 42 is moved downward in FIG. 2, and therefore, the needle is also moved downward and closes a nozzle opening 53.

On the other hand, when the charge of the piezoelectric element 46 is discharged to start the fuel injection, the piezoelectric element 46 is contracted, and as a result, the pressure piston 45 is moved upward in FIG. 2, and thus the fuel pressure in the pressure chamber 47 is reduced. When the fuel pressure in the pressure chamber 47 is reduced, the movable plunger 42 is moved upward in FIG. 2, and therefore, the needle is also moved upward and opens the nozzle opening 53.

FIG. 3 illustrates an engine to which a embodiment of the present invention is applied. Referring to FIG. 3, reference numeral 60 designates a cylinder block, 61 a cylinder head, and 62 a piston. A cylindrical cavity 63 is formed at the center of the top of the piston 62, and a cylinder chamber 64 is defined between the top of the piston 62 and the bottom of the cylinder head 61. The spark plug 65 is arranged at approximately the center of the cylinder head 61. Although not shown in the drawing, an intake port and an exhaust port are formed in the cylinder head 61, and an intake valve 66 (see FIG. 6(a)) and an exhaust valve are arranged respectively at each opening of the intake port and the exhaust port to the cylinder chamber 64. The fuel injector 5 is a swirl type injector, and therefore, an atomized fuel injected from the fuel injector 5 has a wide spread angle and the speed of the injected fuel, which is along the direction of the injection, is relatively slow. The fuel injector 5 is arranged at the top of the cylinder chamber 64, inclined downwardly, so as to inject fuel to the vicinity of the spark plug 65. Furthermore, the direction of the fuel injection and the fuel injection timing of the fuel injector 5 are determined such that the fuel injected from the fuel injector 5 is directed to the cavity 63 formed at the top of the piston 62. An arrow shows a direction of movement of the piston 62.

Figure 4:
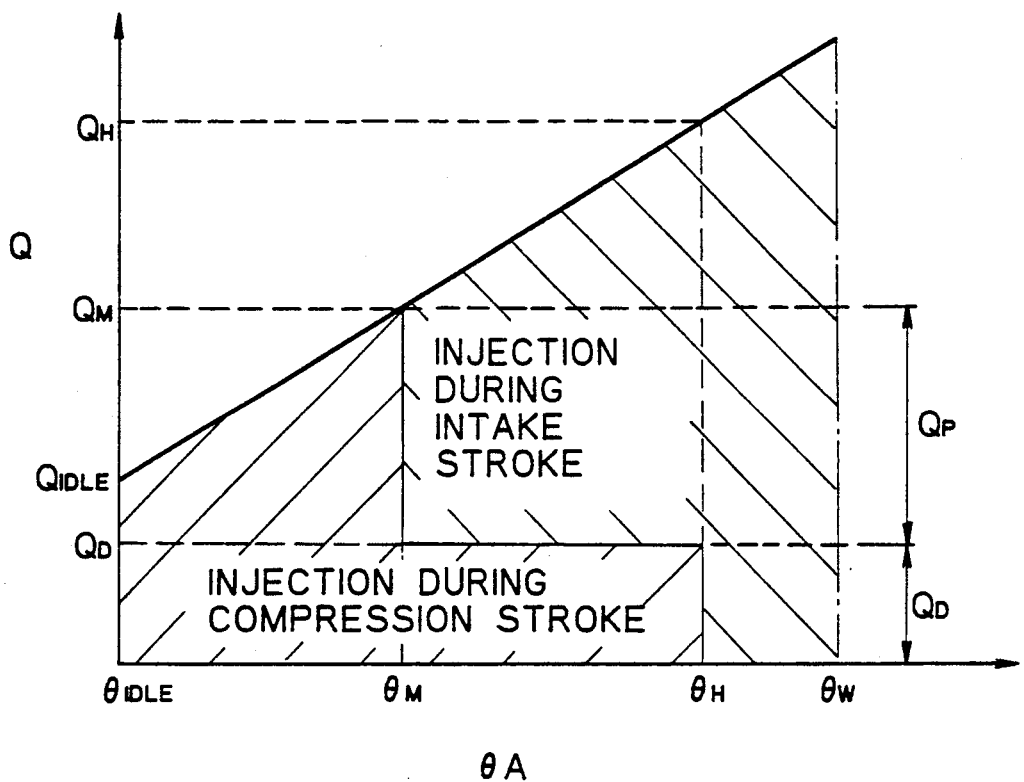
FIG. 4 is a diagram illustrating a control pattern of a fuel injection of the embodiment.

FIG. 4 illustrates a control pattern of a fuel injection according to the embodiment of the present invention. Referring to FIG. 4, the horizontal axis represents a degree of opening $\theta A$ of the accelerator pedal 32 (i.e., an engine load) and the vertical axis represents an amount Q of fuel to be injected. The amount Q of fuel to be injected is calculated on the basis of an engine speed $N_e$ and the degree of opening $\theta A$ of the accelerator pedal 32. When the degree of opening $\theta A$ of the accelerator pedal 32 is equal to or greater than a degree of opening $\theta_{IDLE}$ for idling and is less than a degree of opening $\theta_M$ for an medium engine load, all of the calculated amount of fuel is injected during a compression stroke. At this time, the amount of fuel to be injected during the compression stroke is increased from an amount $Q_{IDLE}$ of fuel for idling to an amount $Q_M$ of fuel for the medium engine load, in accordance with the increase of the degree of opening $\theta A$. When the degree of opening $\theta A$ is equal to $\theta_M$, the amount $Q_C$ of fuel to be injected during the compression stroke is rapidly reduced from $Q_M$ to $Q_D$ and an amount of fuel to be injected during an intake stroke is rapidly increased from 0 to $Q_P$. $Q_M$, as calculated from the following equation, is an amount of fuel corresponding to a medium load.

$$Q_M = Q_D + Q_P$$

Where, $Q_D$ represents a first minimum amount of fuel to be injected during the compression stroke for forming an air-fuel mixture which can be ignited by the spark plug 65, and $Q_P$ represents a second minimum amount of fuel to be injected during the intake stroke for forming an air-fuel mixture in which a flame can be propagated even when the injected fuel is uniformly diffused in the cylinder chamber 64. The first minimum amount $Q_D$ of fuel for an ignition is considerably smaller than an amount $Q_{IDLE}$ of fuel for idling. When the degree of opening $\theta A$ is larger than the degree of opening $\theta_M$ for the medium engine load and smaller than a degree of opening $\theta_H$ for a high engine load, a part of the calculated amount of fuel is injected during the intake stroke and a remaining part of the calculated amount of fuel is injected during the compression stroke. At this time, the amount of fuel to be injected during the compression stroke is constant at $Q_D$ and the amount of fuel to be injected during the intake stroke is increased in accordance with the increase of the degree of opening $\theta A$.

When the degree of opening $\theta A$ is larger than the degree of opening $\theta_H$ and is smaller than or equal to the degree of opening $\theta_W$ for a full opening, all of the calculated amount of fuel is injected during the compression stroke because an air-fuel premixture formed by the fuel injected during the intake stroke is rich enough to be ignited. $Q_H$ corresponding to the degree of opening $\theta_H$ represents a minimum amount of fuel to be injected during the intake stroke for forming an air-fuel mixture which can be ignited by the spark plug 65, even when the injected fuel is uniformly diffused in the cylinder chamber 64.

The intake stroke means a stroke from top dead center in an exhaust process to bottom dead center in an intake process, and the compression process means a stroke from bottom dead center in the intake process to top dead center in a compression process.

Figure 5:
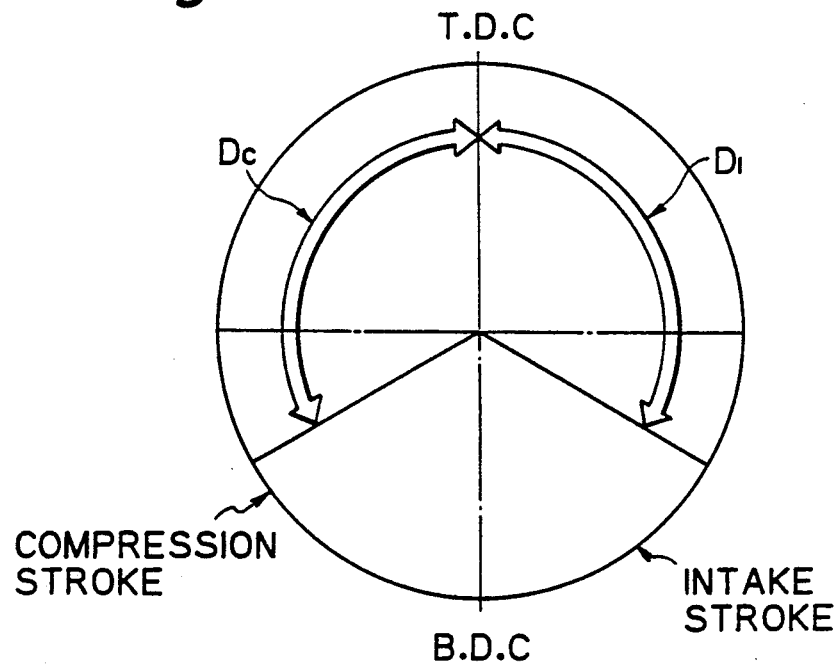
FIG. 5 is a diagram illustrating a fuel injection timing.

FIG. 5 illustrates a fuel injection period. Referring to FIG. 5, a fuel injection during the intake stroke is carried out within a period shown by $D_I$. This period $D_I$ corresponds to approximately a first half of the intake stroke. A fuel injection during the compression stroke is carried out within a period shown by $D_C$. The term $D_C$ corresponds to approximately a latter half of the compression stroke. The term $D_I$ and the term $D_C$ are symmetric with respect to the line connecting T.D.C and B.D.C in FIG. 5. As fuel is injected within the term $D_I$ or $D_C$, injected fuel does not directly impinge the inner face of the cylinder block 60, and therefore, little injected fuel adheres to the inner surface of the cylinder block 60.

When the degree of opening $\theta A$ is smaller than $\theta_M$, i.e., the engine load is low, fuel is injected from the fuel injector 5 during approximately the latter half of the compression stroke (FIG. 5) and directed toward the spark plug 65 and the cavity 63 at the top of the piston 62 shown in FIG. 3. Since the speed of the injected fuel along the injection direction is relatively slow, the pressure in the cylinder chamber 64 is high, and the flow of the gas in the cylinder chamber 64 is relatively slow, the fuel injected from the fuel injector 5 exists in the area K near the spark plug 65. As the distribution of fuel in the area K is not uniform and an air-fuel mixture formed in the area K has an air-fuel ratio of rich to lean, an air-fuel mixture which has a stoichiometric air-fuel ratio and which burns easily exists in the area K. Therefore an air-fuel mixture in the vicinity of the spark plug 65 can be ignited easily and the ignited flame propagated over the whole of the air-fuel mixture to complete the combustion. In this manner, when the engine is operating under a low load, fuel is injected to the vicinity of the spark plug 65 during approximately the latter half of the compression stroke, and therefore, an inflammable air-fuel mixture is formed near the spark plug 65 and thus a good ignition and a good combustion are obtained.

Figure 6:
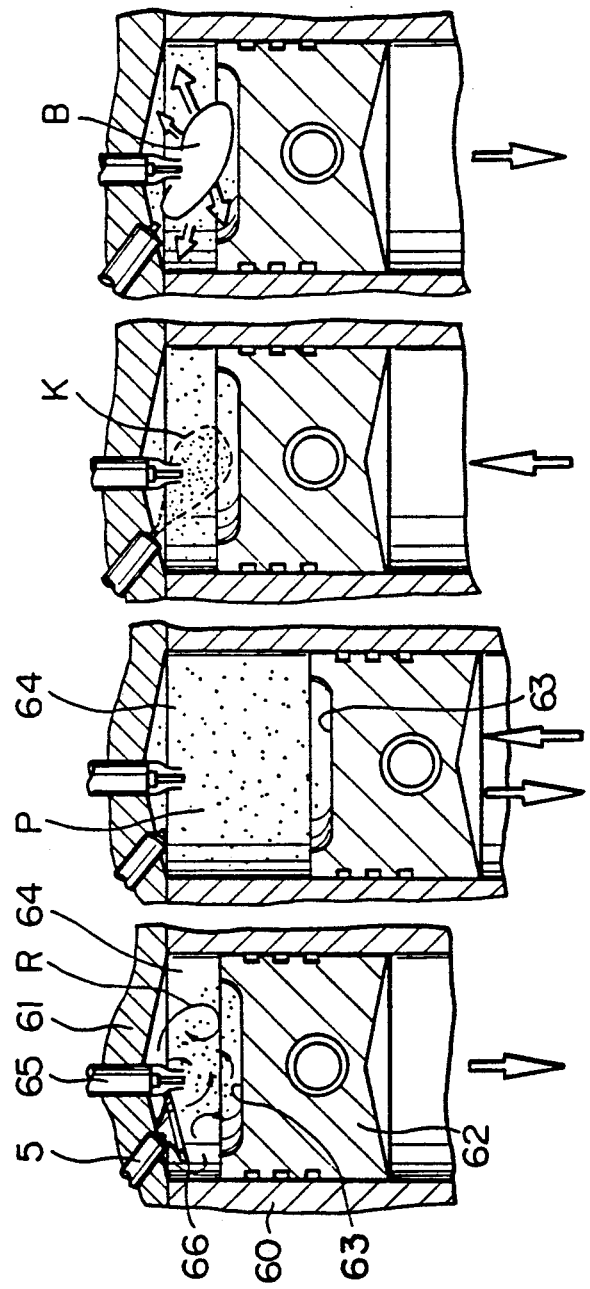
FIG. 6 is a diagram illustrating an operation of the embodiment.

When the degree of opening $\theta A$ is equal to or larger than $\theta_M$ and smaller than $\theta_H$, a part of the calculated amount of fuel is injected from the fuel injector 5 to the spark plug 65 and the cavity 63 during approximately the first half of the intake stroke (FIG. 6(a)). The speed of the injected fuel along with the injection director is relatively slow and the injected fuel is atomized, and therefore, a part of the injected fuel floats in the cylinder chamber 64 and a remaining part of injected fuel impinges on the cavity 63. The injected fuel is diffused in the cylinder chamber 64 by the turbulent flow R caused by intake air flowing from the intake port and an air-fuel premixture P is formed in the cylinder chamber 64 (FIG. 6(b)). The air-fuel ratio of the air-fuel premixture P is such that a flame can be propagated. Fuel is injected during approximately the first half of the intake process (FIG. 5), and therefore, the injected fuel can be fully evaporated and fully diffused in the cylinder chamber to be completely mixed with the air therein.

Also, since fuel is not injected at approximately BDC the fuel injected from the fuel injector 5 does not directly impinge on the inner surface of the cylinder block 60, and thus little injected fuel is adhered to the inner surface of the cylinder block 60.

A remaining part of the calculated amount of fuel is injected from the fuel injector 5 to the spark plug 65 and the cavity 63 during approximately the latter half of the compression stroke. Since the speed of the injected fuel along the injection direction is relatively slow, the pressure in the cylinder chamber 64 is high, and the flow of the gas in the cylinder chamber 64 is relatively slow, the fuel injected from the fuel injector 5 exists in the area K near the spark plug 65 (FIG. 6(c)). As the distribution of the fuel in the area K is not uniform and an air-fuel mixture formed in the area K has an air-fuel ratio of rich to lean, an air-fuel mixture which has a stoichiometric air-fuel ratio and burns easily exists in the area K. Therefore when an inflammable air-fuel mixture near the spark plug 65 is ignited, combustion of the air-fuel mixture in the area K is progressive (FIG. 6(d)), the combustion gas B expands, and a flame is propagated to burn the air-fuel premixture P.

As mentioned above, when the engine is operating under a medium load, a part of a calculated amount of fuel is injected during approximately the first half of the intake stroke to form the air-fuel premixture in the cylinder chamber 64, and a remaining part of the calculated amount of fuel is injected during approximately the latter half of the compression stroke to form the air-fuel mixture in the vicinity of the spark plug 65 for ignition. Accordingly, a good ignition and a good combustion, which fully utilizes the air therein, are obtained.

Especially when all of the calculated amount of fuel is injected during the intake stroke or at an early stage of the compression stroke when the engine is operating under a medium load, as the injected fuel is diffused in the cylinder chamber 64, the air-fuel mixture formed in the cylinder chamber 64 becomes too lean, and thus a problem arises in that ignition and combustion of the air-fuel mixture becomes difficult. On the contrary, when all of the calculated amount of fuel is injected at a late stage of the compression stroke when the engine is operating under a medium load, a problem arises in that much smoke is produced and the full engine power is not obtained because the utilization ratio of the air is low.

Also, under a medium load, the air-fuel ratio of the air-fuel premixture, which is formed by the fuel injected during approximately the first half of the intake stroke, can be leaner than the maximum air-fuel ratio of the air-fuel mixture which can be ignited, and can have an air-fuel ratio of the air-fuel mixture by which flame is propagated, and therefore, the fuel consumption can be reduced due to a lean burn.

The following is an explanation of the means of finding the amount of fuel to be injected during the compression stroke.

FIG. 7 illustrates a two-dimensional map of the amount of fuel $Q_C$ to be injected during the compression stroke; $Q_C$ is found on the basis of the engine speed $N_e$ and the degree of opening $\theta A$. $N_{ea}$ and $N_{eb}$ are adjoining engine speeds shown on the map.

Figure 8:
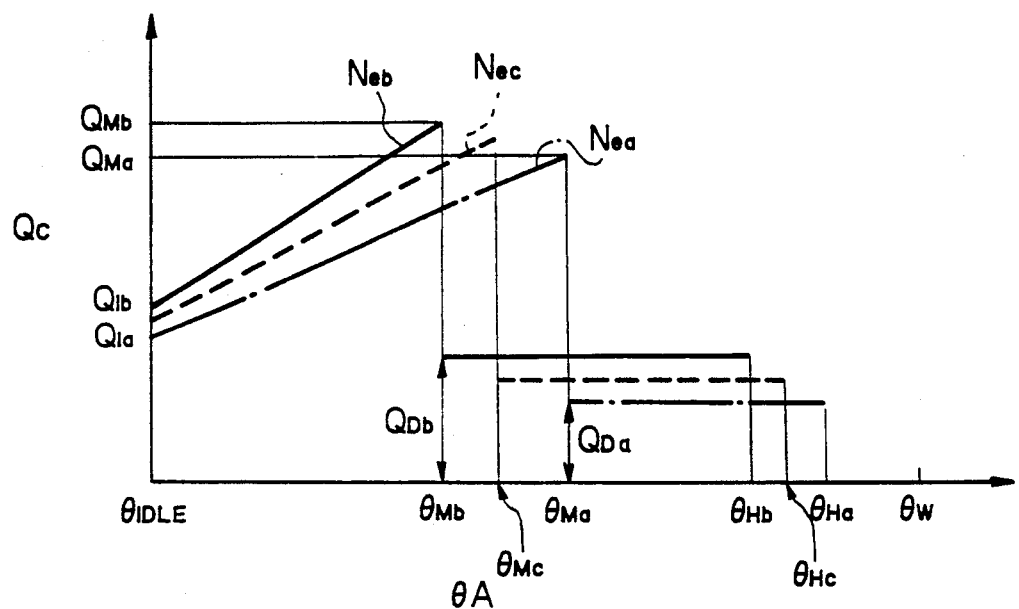
FIG. 8 is a diagram illustrating the relationships among the amount of fuel $Q_C$ to be injected during the compression stroke, the degree of opening $\theta A$ of an accelerator pedal, and an engine speed $N_e$.

FIG. 8 illustrates the relationships among $Q_C$, $N_e$, and $\theta A$ when the engine speed $N_e$ is $N_{ea}$ and $N_{eb}$. When $N_e$ is $N_{eb}$, $Q_C$ is increased from $Q_{Ib}$ to as $Q_{Mb}$ as $\theta A$ is increased from $\theta_{IDLE}$ to $\theta_{Mb}$, $Q_C$ is discontinuously reduced from $Q_{Mb}$ to $Q_{Db}$ when $\theta A$ is equal to $\theta_{Mb}$, $Q_C$ is constant at $Q_{Db}$ when $\theta A$ is increased from $\theta_{Mb}$ to $\theta_{Hb}$, $Q_C$ is discontinuously reduced from $Q_{Db}$ to 0 when $\theta A$ is equal to $\theta_{Hb}$, and $Q_C$ is constant at 0 when $\theta A$ is increased from $\theta_{Hb}$ to $\theta_W$. When the engine speed is $N_{ea}$, $Q_C$ similarly changes.

When the engine speed is $N_{ec}$ which is an intermediate speed between $N_{ea}$ and $N_{eb}$ and is not shown on the map (FIG. 7), an ideal amount of fuel to be injected during the compression stroke is shown by a broken line in FIG. 8.

Figure 9:
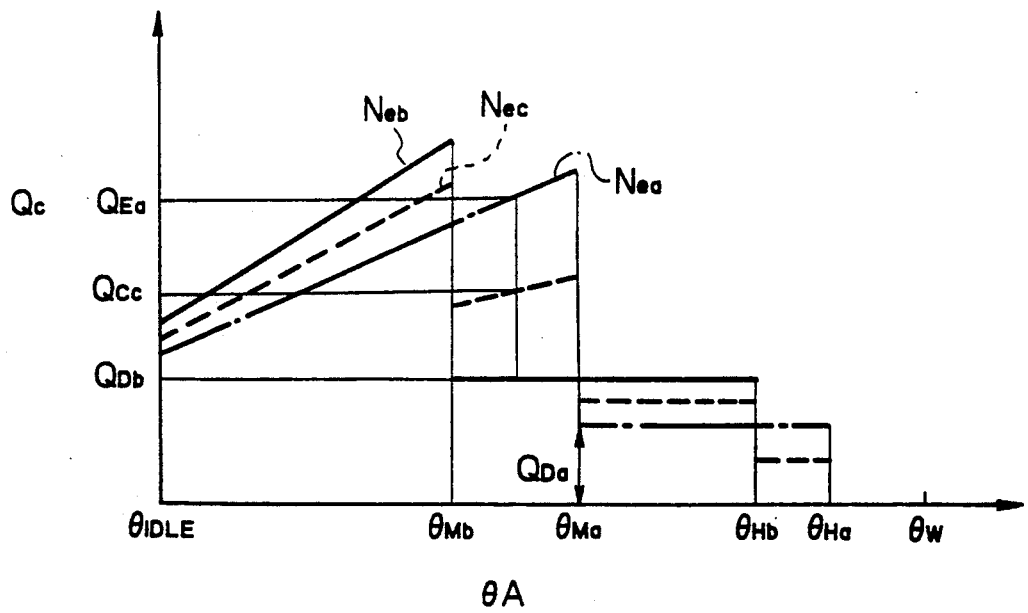
FIG. 9 is a diagram explaining how to calculate $Q_C$ corresponding to $N_{ec}$ by a linear interpolation method, without considering the discontinuous point in FIG. 8.

Nevertheless, when a linear interpolation method, which is a conventional method, is used to find the amount $Q_C$ of fuel to be injected during the compression stroke when the engine speed is $N_{ec}$, without considering the discontinuous point, $Q_C$ (shown by a broken line in FIG. 9) is shifted from the ideal amount of fuel to be injected during the compression stroke (FIG. 8). For example, by the linear interpolation method, the amount $Q_{Cc}$ of fuel to be injected during the compression stroke when $\theta A$ is between $\theta_{Mb}$ and $\theta_{Ma}$ is calculated from the following equation.

$$Q_{Cc} = \frac{N_{eb} - N_{ec}}{N_{eb} - N_{ea}} \cdot (Q_{Ea} - Q_{Db}) + Q_{Db}$$

$$= \frac{1}{2} \cdot (Q_{Ea} - Q_{Db}) + Q_{Db}$$

Namely, when the amount of fuel to be injected during the compression stroke is calculated by the linear interpolation method, without considering the discontinuous point ($\theta_{Ma}$, $\theta_{Mb}$, etc.), $Q_C$ is far different from the ideal amount of fuel to be injected during the compression stroke (FIG. 8) between $\theta_{Mb}$ and $\theta_{Ma}$, and between $\theta_{Hb}$ and $\theta_{Ha}$, and thus a problem arises in that an ignition of the air-fuel mixture becomes difficult, misfiring occurs, and a large amount of smoke is produced due to the poor combustion.

The reason why $Q_C$ calculated by the linear interpolation method when engine speed is $N_{ec}$ is far different from the ideal amount of fuel to be injected during the compression stroke (FIG. 8) is that discontinuous points at $N_{ec}$ are not calculated. Therefore, the degree of opening $\theta A$ corresponding to the discontinuous points are shown on the map and $\theta_{Mc}$ corresponding to the discontinuous point at $N_{ec}$ is calculated by the linear interpolation method from $\theta_{Mb}$ and $\theta_{Ma}$ (see FIG. 8). Note, $\theta_{Hc}$ is similarly calculated.

Nevertheless, the discontinuous point on the map, for example, $\theta_{Mb}$ corresponding to $Q_{Mb}$ and $\theta_{Mb'}$ corresponding to $Q_{Db}$, which is slightly larger than $\theta_{Mb}$, must be described (see FIG. 7 and FIG. 8). Namely to describe one discontinuous point, two $\theta A$, i.e., $\theta_{Mb}$ and $\theta_{Mb'}$ must be added and in this embodiment, when two discontinuous points exist, 4$\theta A$ must be added per one $N_e$. Accordingly, when the number of shown engine speeds $N_e$ is n, the number of $\theta A$ to be shown on the map is increased by 4·n (see FIG. 7), and thus the memory areas must be increased by (4·n)·n. Therefore a problem arises in that the memory capacity of the ROM 22 (see FIG. 1) must be greatly increased, and in particular, it must be noted that it is difficult to increase the memory capacity of the electronic control unit 20 for controlling the engine.

Therefore, in this embodiment of the present invention, $\theta A$ is converted into a conversion value IQ (see FIG. 12) and $Q_C$ is found on the basis of $N_e$ and IQ.

Figure 10:
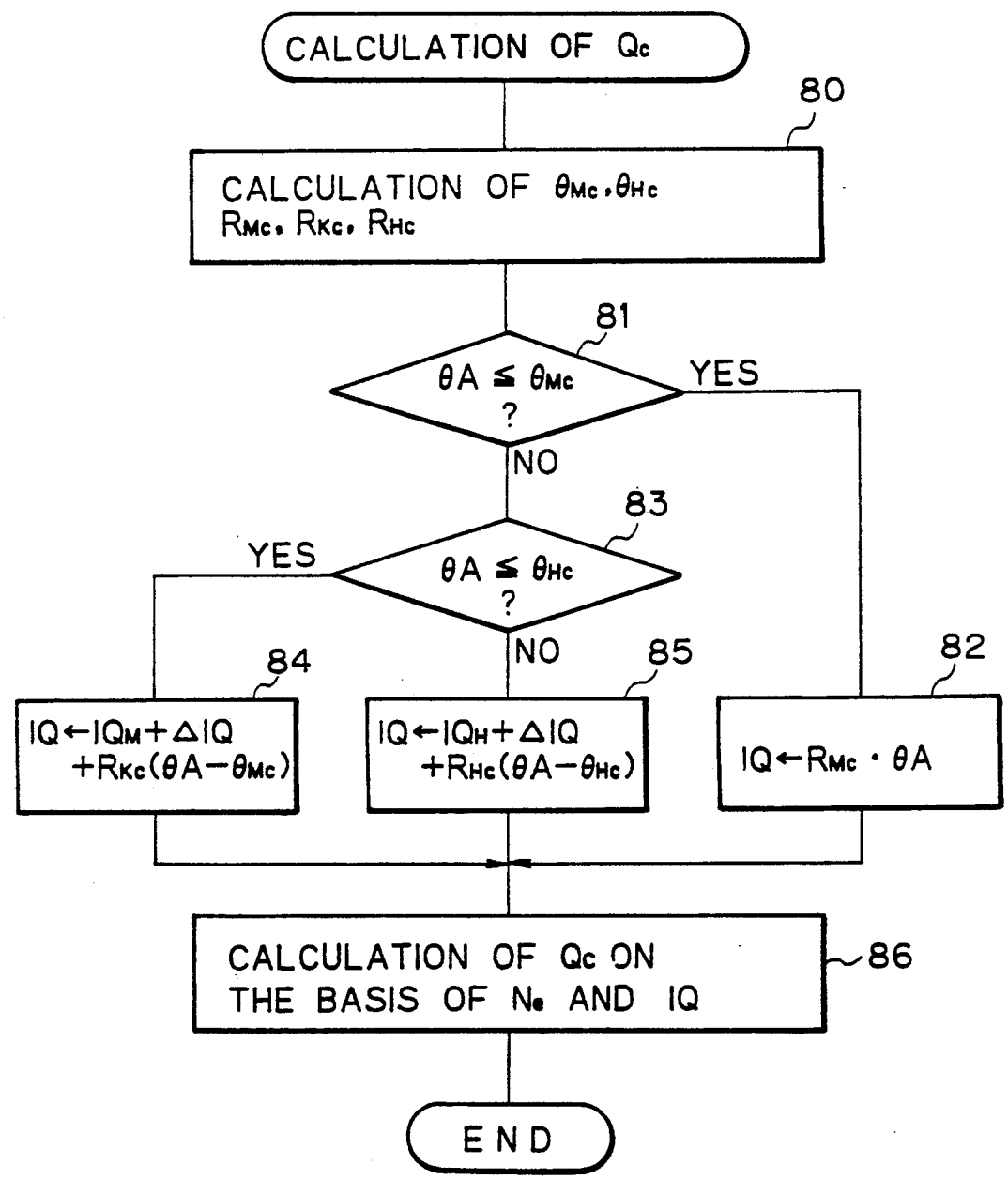
FIG. 10 is a flow chart for calculating $Q_C$.

FIG. 10 illustrates a routine for calculating the amount of fuel $Q_C$ to be injected during the compression stroke. This routine is processed by sequential interruptions executed at predetermined intervals.

Referring to FIG. 10, in step 80, $\theta_{Mc}$ and $\theta_{Hc}$ corresponding to the discontinuous positions, inclinations $R_{Mc}$, $R_{Kc}$, $R_{Hc}$ at $N_{ec}$ are calculated by the linear interpolation method on the basis of a one-dimensional map (see FIG. 11) of $N_e$.

Figures 11, 12:
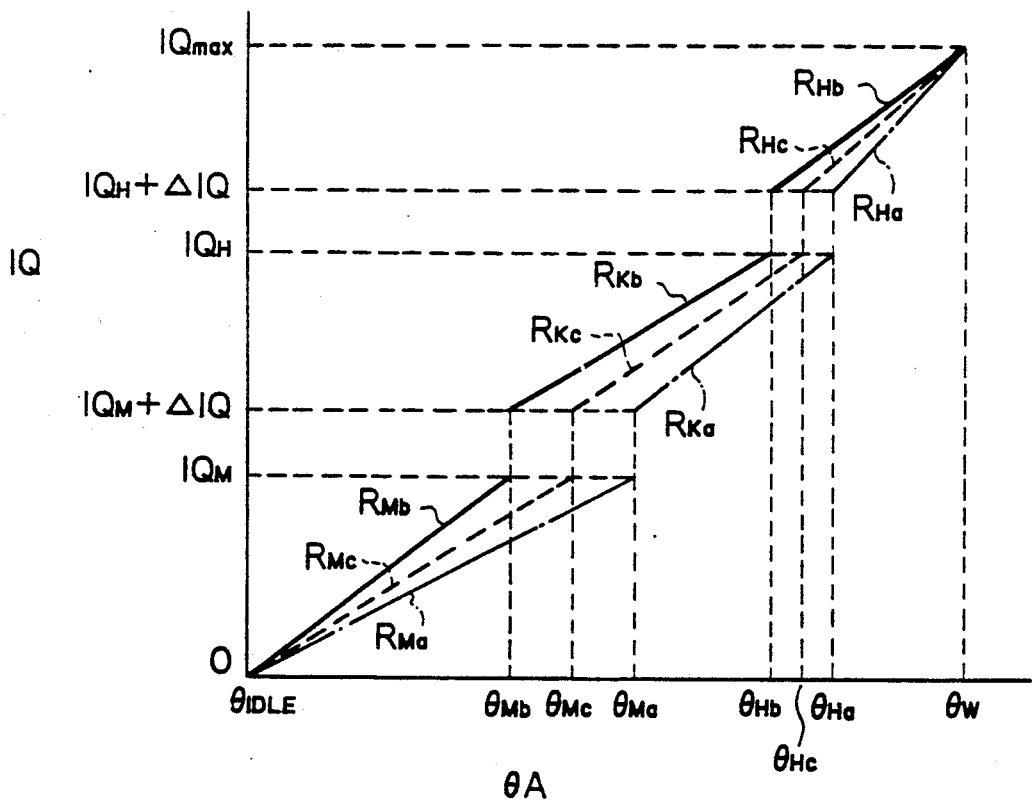
FIG. 11 is a view illustrating the map.
FIG. 12 is a diagram illustrating the relationship between the degree of opening $\theta A$ of the accelerator pedal and a conversion value.

Referring to FIG. 11, $\theta M$, $\theta H$, $R_M$, $R_K$, and $R_H$ are described against $N_e$ and this map is memorized in the ROM 22 (see FIG. 1).

Referring to FIG. 12, IQ is in proportion to $\theta A$. $R_M$, $R_K$, and $R_H$ show the inclinations of straight lines which represent the relationship between $\theta A$ and IQ. $R_M$ represents the inclination of the straight line from $\theta_{IDLE}$ to $\theta_M$, $R_K$ represents the inclination of a straight line from $\theta_M$ to $\theta_H$, and $R_H$ represents the inclination of the straight line from $\theta_H$ to $\theta_W$. The conversion value IQ increases from 0 to $IQ_M$ as $\theta A$ increases from $\theta_{IDLE}$ to $\theta_M$. $\theta_M$ changes such as $\theta_{Ma}$, $\theta_{Mb}$ in accordance with the engine speed and $R_M$ also changes such as $R_{Ma}$, $R_{Mb}$ in accordance with the engine speed. $IQ_M$ corresponding to the discontinuous point does not change in accordance with the engine speed. IQ discontinuously changes from $IQ_M$ to $IQ_M + \Delta IQ$ when $\theta A$ becomes larger than $\theta_M$. IQ increases from $IQ_M + \Delta IQ$ to $IQ_H$ as $\theta A$ increases from $\theta_M$ to $\theta_H$. $\theta_H$ changes such as $\theta_{Ha}$, $\theta_{Hb}$ in accordance with the engine speed and $R_K$ also changes such as $R_{Ka}$, $R_{Kb}$ in accordance with the engine speed. $IQ_M + \Delta IQ$ and $IQ_H$ corresponding to the discontinuous point do not change in accordance with the engine speed. IQ discontinuously charges from $IQ_H$ to $IQ_H + \Delta IQ$ when $\theta A$ becomes larger than $\Delta_H$. IQ increases from $IQ_H + \Delta IQ$ to $IQ_{max}$ as $\theta A$ increases from $\theta_H$ to $\theta_W$. $R_H$ changes such as $R_{Ha}$, $R_{Hb}$ in accordance with the engine speed.

As mentioned above, the degree of opening of the accelerator pedal 32 corresponding to the discontinuous point changes in accordance with the engine speed, but the conversion value IQ corresponding to the discontinuous point does not change in accordance with the engine speed but remains constant. Accordingly, by describing $IQ_M$, $IQ_M + \Delta IQ$, $IQ_H$, and $IQ_H + \Delta IQ$ on the map (see FIG. 13), all of the discontinuous points corresponding to all of the engine speeds shown on the map can be described. Therefore a large increase of the memory capacity becomes unnecessary, and thus the electronic control unit 20 for controlling the engine can be used as is.

Turning to FIG. 10, at step 81 it is determined whether or not $\theta A$ is less than or equal to $\theta_{Mc}$. When $\theta A \leq \theta_{Mc}$, the routine goes to step 82 and IQ is calculated by the following equation.

$$IQ = R_{Mc} \cdot \theta A$$

Therefore, IQ changes from 0 to $IQ_M$ when $\theta A$ changes from $\theta_{IDLE}$ to $\theta_{Mc}$.

Conversely, when $\theta A > \theta_{Mc}$, the routine goes to step 83 and it is determined whether $\theta A$ is less than or equal to $\theta_{Hc}$. When $\theta A \leq \theta_{Hc}$, i.e., when $\theta_{Mc} < \theta A \leq \theta_{Hc}$, the routine goes to step 84, and IQ is calculated by the following equation.

$$IQ = IQ_M + \Delta IQ + R_{Kc} \cdot (\theta A - \theta_{Mc})$$

Therefore, IQ changes from $IQ_M + \Delta IQ$ to $IQ_H$ when $\theta A$ changes from $\theta_{Mc}$ to $\theta_{Hc}$.

Conversely, when $\theta A > \theta_{Hc}$, the routine goes to step 85 and IQ is calculated by the following equation.

$$IQ = IQ_H + \Delta IQ + R_{Hc} \cdot (\theta A - \theta_{Hc})$$

Therefore, IQ changes from $IQ_H + \Delta IQ$ to $IQ_{max}$ when $\theta A$ changes from $\theta_{Hc}$ to $\theta_W$.

Then, at step 86, the amount of fuel $Q_C$ to be injected during the compression stroke is calculated by the linear interpolation method on the basis of a map (FIG. 13).

FIG. 13 illustrates a two-dimensional map of $Q_C$. $Q_C$ is found on the basis of $N_e$ and IQ.

Figure 14:
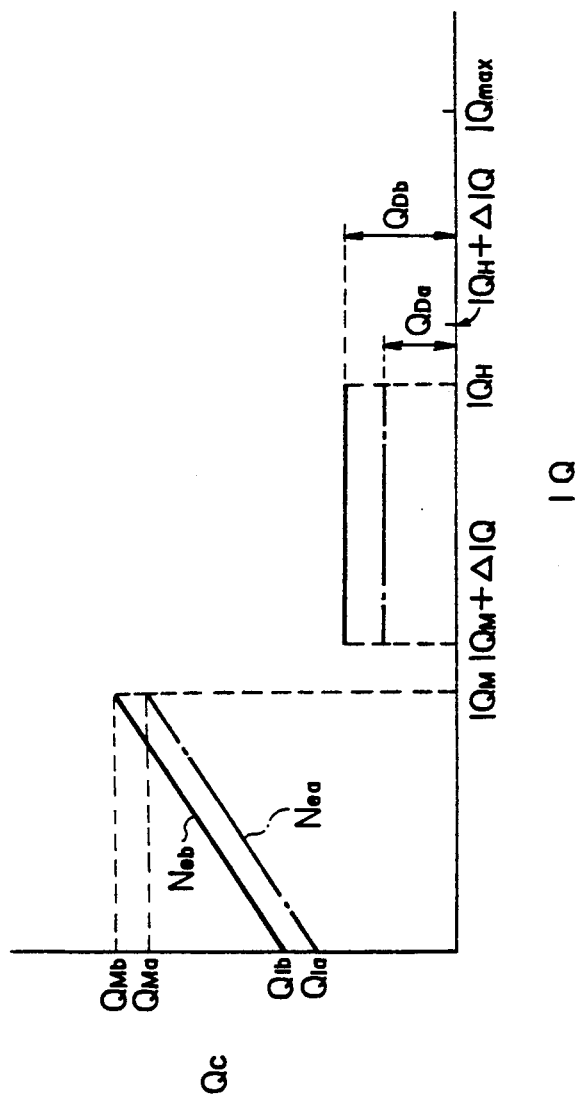
FIG. 14 is a diagram illustrating the relationships among $Q_C$, IQ, and $N_e$.

FIG. 14 illustrates the relationships among $Q_C$, $N_e$, and IQ when $N_e$ is $N_{ea}$ and $N_{eb}$. Referring to FIG. 14, when $N_e$ is $N_{ea}$, $Q_C$ is increased from $Q_{Ia}$ to $Q_{Ma}$ as IQ is increased from 0 to $IQ_M$. When $N_e$ is $N_{eb}$, $Q_C$ is increased from $Q_{Ib}$ to $Q_{Mb}$ as IQ is increased 0 to $IQ_M$. The discontinuous points $IQ_M$, $IQ_M + \Delta IQ$ are always constant. $Q_C$ discontinuously changes from $Q_{Ma}$ to $Q_{Da}$ or from $Q_{Mb}$ to $Q_{Db}$ when IQ changes from $IQ_M$ to $IQ_M+\Delta IQ$. $Q_C$ is constant at $Q_{Da}$ or $Q_{Db}$ when IQ exists between $IQ_M+\Delta IQ$ and $IQ_H$. The discontinuous points $IQ_H$, $IQ_H+\Delta IQ$ are always constant. $Q_C$ discontinuously changes from $Q_{Da}$ to 0 or from $Q_{Db}$ to 0 when IQ changes from $IQ_H$ to $IQ_H+\Delta IQ$. When IQ is larger than $IQ_H+\Delta IQ$, $Q_C$ is equal to 0.

Since $Q_C$ calculated by the linear interpolation method on the basis of $N_e$ and IQ is not shifted from the ideal amount of fuel to be injected during the compression stroke, a good ignition and a good combustion of the air-fuel mixture can be obtained.

Furthermore, by converting $\theta A$ into IQ, the large increase of the memory capacity becomes unnecessary, and thus the electronic control unit 20 for controlling the engine can be used as is.

Note, in this embodiment, the calculation of the amount of fuel to be injected during the compression stroke is explained, but this invention can be applied to calculating the amount of fuel to be injected during an intake stroke, the fuel injection timing during the compression and intake stroke, and an ignition timing.

Furthermore, this invention can be applied to another type of an engine.

Although the invention has been described with reference to specific embodiments chosen for purposes of illustration, it should be apparent that numerous modifications could be made thereto by those skilled in the art without departing from the basic concept and scope of the invention.

I claim:

1. A control device for an internal combustion engine, comprising:

a calculating means for calculating an engine control value for controlling an engine running condition, on the basis of a conversion value into which a first engine condition value which represents an engine running condition is converted, said engine control value discontinuously changing at a discontinuous point in accordance with a change of said first engine condition value, the first engine condition value corresponding to said discontinuous point changing in accordance with a change of a second engine condition value which represents the engine running condition; and a converting means for converting said first engine condition value into said conversion value, the conversion value corresponding to said discontinuous point remaining constant even when said second engine condition value changes.

2. A control device according to claim 1, wherein said first engine condition value represents an engine load and said second engine condition value represents an engine speed.

3. A control device according to claim 1, wherein said conversion value increases as said first engine condition value increases.

4. A control device according to claim 1, wherein said conversion value is in proportion to said first engine condition value.

5. A control device according to claim 1, wherein said conversion value discontinuously changes in accordance with the change of said first engine condition value.

6. A control device according to claim 1, wherein said conversion value is found by a linear interpolation method on the basis of said first and second engine condition values.

7. A control device according to claim 1, wherein the internal combustion engine has a fuel injector for injecting fuel directly into the cylinder and during an intake stroke, said fuel injector injects a part of an amount of fuel to be injected, and during a compression stroke, said fuel injector injects a remaining part of the amount of fuel to be injected.

8. A control device according to claim 7, wherein said engine control value represents an amount of fuel to be injected during an intake stroke.

9. A control device according to claim 7, wherein said engine control value represents an amount of fuel to be injected during a compression stroke.

10. A control device according to claim 7, wherein said engine control value represents a fuel injection timing during an intake stroke.

11. A control device according to claim 7, wherein said engine control value represents a fuel injection timing during a compression stroke.

12. A control device according to claim 7, wherein said engine control value represents an ignition timing.

* * * * *